(12) United States Patent
Park et al.

(10) Patent No.: US 8,736,721 B2
(45) Date of Patent: May 27, 2014

(54) METHOD AND APPARATUS FOR IMAGE PROCESSING

(71) Applicant: Samsung Electronics Co., Ltd., Gyeonggi-do (KR)

(72) Inventors: Hee-Chan Park, Seoul (KR); Min-Kyu Park, Seoul (KR); Han-Sae Song, Seoul (KR); Young-Kwon Yoon, Seoul (KR); Yong-Gu Lee, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 13/652,036

(22) Filed: Oct. 15, 2012

(65) Prior Publication Data
US 2013/0107084 A1 May 2, 2013

Related U.S. Application Data

(63) Continuation of application No. PCT/KR2011/002714, filed on Apr. 15, 2011.

(30) Foreign Application Priority Data

Apr. 15, 2010 (KR) .................. 10-2010-0034869

(51) Int. Cl.
H04N 9/64 (2006.01)
G06K 9/38 (2006.01)
H04N 5/357 (2011.01)
G06T 7/00 (2006.01)

(52) U.S. Cl.
CPC .............. H04N 5/357 (2013.01); G06T 7/0085 (2013.01)
USPC ............ 348/242; 348/251; 382/163; 382/275

(58) Field of Classification Search
CPC . H04N 5/2176; H04N 5/3653; H04N 5/3658; H04N 5/365; G06T 7/0083; G06T 7/0085
USPC .......... 348/242, 251, 252, 234, 237; 382/163, 382/266
See application file for complete search history.

(56) References Cited

U.S. PATENT DOCUMENTS 6,370,278 B1 * 4/2002 Waguri .................... 382/266
6,978,050 B2 * 12/2005 Hunter et al. ............. 382/275
(Continued)

FOREIGN PATENT DOCUMENTS

KR 10-0860877 B1 9/2008

OTHER PUBLICATIONS

Nakamura, Junichi; "Image Sensors and Signal Processing for Digital Still Cameras;" Taylor & Francis Group; 2006.

Primary Examiner — John Villecco
(74) Attorney, Agent, or Firm — Cha & Reiter, LLC.

(57) ABSTRACT

The present disclosure relates to a method and an apparatus for image processing. The method includes: setting a block including at least one pixel and a window including the at least one block, with a center pixel as a reference; converting an input image in a YCbCr format to a monochrome image; determining a magnitude of an edge component and an edge direction in the window; determining a weight of the block in consideration of the magnitude of the edge component and the edge direction; and determining a color signal value of the center pixel by reflecting the weight of the block in the monochrome-converted window.

20 Claims, 5 Drawing Sheets

(56) References Cited

U.S. PATENT DOCUMENTS

| | | | |
|---|---|---|---|
| 7,200,279 B1 | 4/2007 | Lin | |
| 7,409,084 B2 | 8/2008 | Jung | |
| 7,570,288 B2 * | 8/2009 | Hasegawa et al. | 348/241 |
| 8,125,543 B2 * | 2/2012 | Cho | 348/241 |
| 8,199,227 B2 * | 6/2012 | On et al. | 348/252 |
| 8,248,664 B2 * | 8/2012 | Sato | 358/3.26 |
| 2006/0153442 A1 | 7/2006 | Song et al. | |
| 2006/0181740 A1 | 8/2006 | Kim et al. | |
| 2006/0245661 A1 * | 11/2006 | Beazley | 382/260 |
| 2006/0262196 A1 | 11/2006 | Hasegawa et al. | |
| 2007/0002154 A1 | 1/2007 | Kang et al. | |
| 2008/0075174 A1 | 3/2008 | Jiang et al. | |
| 2010/0303346 A1 * | 12/2010 | Suito | 382/163 |
| 2011/0032396 A1 * | 2/2011 | Park et al. | 348/273 |
| 2011/0090370 A1 * | 4/2011 | Cote et al. | 348/237 |

* cited by examiner

METHOD AND APPARATUS FOR IMAGE PROCESSING

CROSS REFERENCE TO RELATED APPLICATION

The present application is a Continuation of PCT/KR 2011/002714 filed on Apr. 15, 2011 which claims a priority from an earlier Korean Patent Application 10-2010-0034869 filed on Apr. 15, 2010, all of which are hereby incorporated by reference in their entirety.

The present invention relates to a method and an apparatus for image processing.

BACKGROUND

Examples of image sensors used in portable terminals such as a camera module, include CMOS (Complementary Metal-Oxide Semiconductor) image sensors, CCD (Charge-Coupled Device) image sensor, etc. Among them, the CMOS image sensor has a relatively high degree of integration, and is thus easily produced on a large scale. As a result, CMOS image sensors are used in most mobile phone cameras, and are used in some low-priced digital cameras, as well. The CMOS image sensor has the advantage of being relatively inexpensive and requires relatively low power, but has a problem in that it is vulnerable to noise. Also, this noise is processed in such a manner as to use software to compensate for erroneous pixel values of the image provided by an image sensor.

In general, there is a limit on the frequency range of visible light perceivable by the human eye. The human eye can actually perceive a relatively small range of colors, especially at a low or high illuminance. Therefore, if noise removal is necessary, it may be performed with a scheme for reducing noise by reducing color information in an image at an extremely low or high luminance values of the image distribution, which the human eye has difficulty perceiving. Namely, in FIG. 1, a relatively low gain is applied to a color signal which has image information with a luminance equal to or smaller than Y1 or a luminance equal to or greater than Y2. In this scheme, it is usual that a process for reducing noise by reducing color information of an image (i.e., color desaturation) is performed after a process for removing the overall noise contained in the image (i.e., color noise reduction) is performed. In this case, if a luminance between adjacent areas rapidly changes, some pixels of the image are processed in monochrome. Therefore, a problem arises in that a gray spot is formed in the image.

SUMMARY OF THE INVENTION

Accordingly, the present invention has been made to solve the above-mentioned problems occurring in the prior art and provides additional advantages, by providing a method and an apparatus, which process an image without generating a gray spot while removing noise included in the image.

In accordance with an aspect of the present invention, there is provided a method for processing an image includes: converting an input image in a YCbCr format to a monochrome image; setting a block comprising at least one pixel and a window comprising the at least one block, with a pixel from the monochrome image set as a reference center pixel; determining a magnitude of an edge component and an edge direction in the window; determining a weight of the block in consideration of the magnitude of the edge component and the edge direction; and determining a color signal value of the center pixel by reflecting the weight of the block in the monochrome-converted window.

In accordance with another aspect of the present invention, an apparatus for image processing, the apparatus includes: a preprocessor for preprocessing a signal provided by an image sensor; an image format converter for converting an image in an RGB format to an image in a YCbCr format; and a noise remover for setting, with a pixel from the monochrome image set as a reference center pixel, a block having at least one pixel and a window comprising the at least one block, converting the image in the YCbCr format to a monochrome image, determining a magnitude of an edge component and an edge direction in the window, determining a weight of the block in consideration of the magnitude of the edge component and the edge direction, and determining a color signal value of the center pixel by reflecting the weight of the block in the monochrome-converted window.

In accordance with another aspect of the present invention, a portable terminal includes: an RF unit for modulating a voice of a user, text and control data of a wireless signal and then transmitting, through an antenna, the wireless signal to a base station of a mobile communication network, and demodulating a wireless signal from the base station; a wireless data processor, which is arranged between a speaker/microphone and the RF unit, and converts the wireless signal to voice data; and an image signal processor which comprises: a preprocessor for preprocessing a signal provided by an image sensor; an image format converter for converting an image in an RGB format to an image in a YCbCr format; and a noise remover for setting, with a center pixel of the image as a reference, a block having at least one pixel and a window comprising the at least one block, converting the image in the YCbCr format to a monochrome image, determining a magnitude of an edge component and an edge direction in the window, determining a weight of the block in consideration of the magnitude of the edge component and the edge direction, and determining a color signal value of the center pixel by reflecting the weight of the block in the monochrome-converted window.

With the method and apparatus for image processing of the present invention, an image can be processed without generating a gray spot while removing noise included in the image.

Also, the method for image processing of the present invention provides, by first performing a process (i.e. color desaturation) for reducing color information of the image (i.e., color desaturation), it is possible to prevent the generation of gray spots when noise in the image is removed.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE INVENTION

Hereinafter, exemplary embodiments of the present invention will be described in detail with reference to the accompanying drawings. The following description includes specific details, and the specific details are only provided to help a more general understanding of the present invention. Therefore, it will be apparent to a person having ordinary knowledge in the technical field of the present invention that predetermined variations and modifications may be made in the specific details without departing from the scope of the present invention.

Figure 2:
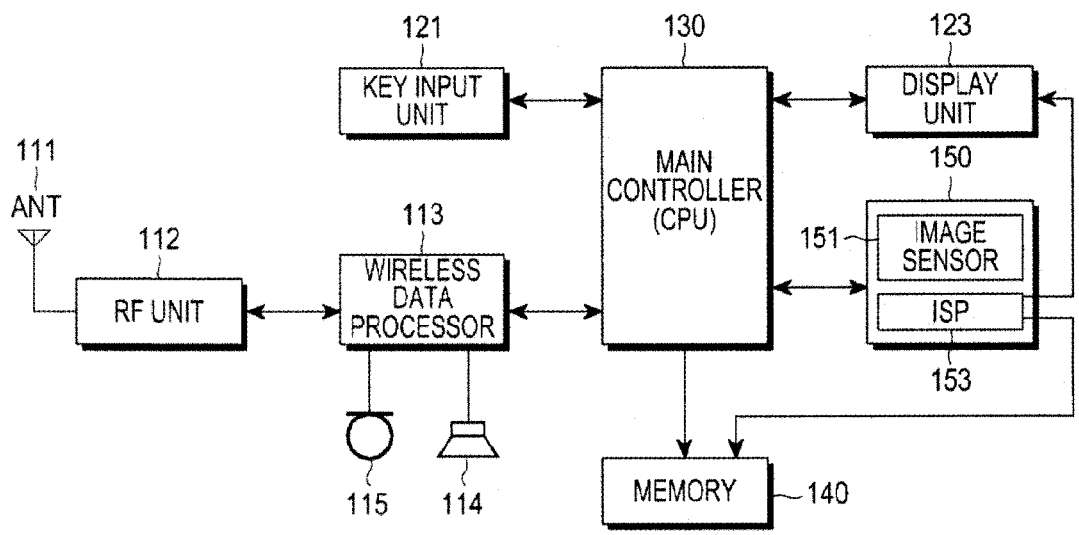
FIG. 2 is a block diagram illustrating the configuration of a portable terminal according to an embodiment of the present invention.

FIG. 2 is a block diagram illustrating the configuration of a portable terminal according to an embodiment of the present invention. A mobile communication terminal (i.e. a portable terminal), for example, is one of various devices, each of which may include an image processing apparatus of the present invention capable of processing an image. In this regard, in order to describe a hardware-based apparatus to which the present invention can be applied, the following is a description of the configuration of the mobile communication terminal. Although an embodiment of the present invention illustrates that the image processing apparatus of the present invention is included in the mobile communication terminal, the present invention is not limited to this configuration. Therefore, it goes without saying that the image processing apparatus of the present invention can be applied correspondingly to each of various devices (e.g. a digital camera) that use image processing.

Referring to FIG. 2, a portable terminal for processing an image by using an image processing apparatus includes an antenna 111, an RF (Radio Frequency) unit 112, a wireless data processor 113, a key input unit 121, a display unit 123, a main controller (i.e., a Central Processing Unit or CPU) 130, a memory unit 140, and a camera module 150 comprising an image sensor 151 and an ISP 153 (Image Signal Processor).

The RF unit 112 uses a voice signal of a user, text and control data to modulate a wireless signal (e.g., an RF signal), and then transmits the wireless signal to a Base Station (BS) (not shown) of a mobile communication network through the antenna 111. Also, the RF unit 112 receives a wireless signal from the BS through the antenna 111, demodulates the received wireless signal to voice, text and control data, and then outputs the voice, the text and the control data. Under the control of the main controller 130, the wireless data processor 113 decodes the voice data received by the RF unit 112, and then outputs the decoded voice data as an audible voice through the speaker 114. Also, under the control of the main controller 130, the wireless data processor 113 constructs, as data, a voice signal of the user, which is inputted via a microphone 115, and then the wireless data processor 113 outputs the voice data to the RF unit 112. Also, the wireless data processor 113 provides, to the main controller 130, text and control data received by the RF unit 112.

The key input unit 121, which receives, as input, phone numbers or text from the keys activated by a user, includes keys for inputting numbers and text information and function keys for setting various functions, and outputs signals, which are inputted through the keys, to the main controller 130. The key input unit 121 may be implemented by an input device, such as a keypad or a touchscreen, which are usually included in a portable terminal.

The display unit 123 may be implemented by a display device such as a Liquid Crystal Display (LCD). Under the control of the main controller 130, the display unit 123 displays messages indicating various operation states of the relevant portable terminal, images generated by the camera module 150, images stored in the memory 140, information, images generated by an application program executed by the main controller 130 and other images generated in well-known fashions.

The main controller 130 controls the overall operation of the mobile communication terminal by comprehensively controlling the operations of the above function units. Namely, the main controller 130 performs processing according to a number and a menu selection signal which are inputted through the key input unit 121, stores information in the memory 140, controls operation of an application program for basic functions of the portable terminal, and processes an application program the execution of which has been requested. The main controller 130 stores an application program, which has been installed selectively by the user in the memory 140, reads and then processes the application program in response to an execution request. Also, the main controller 130 performs processing according to the reception of an external capture signal upon receiving as input the external capture signal through the camera module 150, and then outputs image output signals through the display unit 123 including a camera-captured image as are necessary for various operations.

The camera module 150 includes an image sensor 151, such as a CCD (Charged-Coupled Device) sensor or a CMOS (Complementary Metal-Oxide Semiconductor) sensor, which detects color information of the subject and then converts the detected color information to an electrical image signal. The camera module 150 further includes an Image Signal Processor (ISP) 153 for processing information provided by the image sensor 151. The image signal processor 153 preprocesses a signal, which is input from the image sensor 151, converts an image in the RGB (Red-Green-Blue) format to an image in the YCbCr format, and then converts the image in the YCbCr format to a monochrome image. Then, in order to determine color signal values of all pixels included in the image, the image signal processor 153 sequentially sets all the pixels included in the image as center pixels, and then determines color signal values of all the pixels included in the image by repeatedly performing, for all the pixels, a process for determining a color signal value of a pixel set as a center pixel. Specifically, in order to determine a color signal value of each center pixel, the image signal processor 153 sets a window of a predetermined size, with each center pixel as the reference. At this time, the window includes multiple uniform blocks. Then, the image signal processor 153 determines the magnitude of an edge component and an edge direction in the window, determines weights of the blocks in consideration of the magnitude of the edge component and the edge direction, and then determines a color signal value of each center pixel by reflecting the weights of the blocks in the monochrome-converted window.

Figure 3:
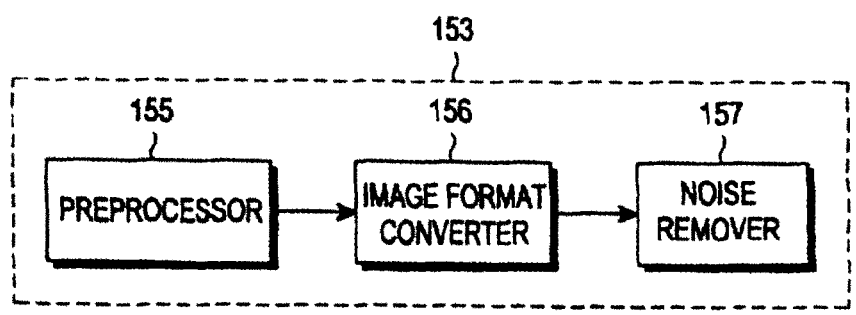
FIG. 3 is a block diagram illustrating the configuration of an image signal processor included in a portable terminal according to an embodiment of the present invention.

FIG. 3 is a block diagram illustrating the configuration of an image signal processor (ISP) 153 (see also FIG. 2) included in a portable terminal according to an embodiment of the present invention. Referring to FIG. 3, the image signal processor 153 includes a preprocessor 155 which compensates for both a defective pixel and a vertical line of a signal provided by the image sensor 151 (see FIG. 2), and an image format converter 156 which converts an image in the RGB format—provided by the preprocessor 155—to an image in the YCbCr format and then provides the image in the YCbCr format.

Also, the image signal processor 153 includes a noise remover 157.

Figure 1:
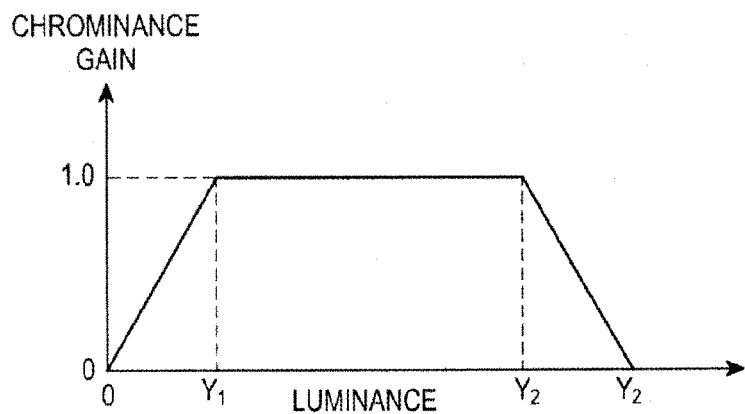
FIG. 1 is an illustrative view showing a graph for explaining a typical method for reducing noise by reducing color information of an image.

It is usual that the conventional image processor removes noise by reducing color information at an extremely low illuminance and color information at an extremely high illuminance as illustrated in FIG. 1. However, when the color information at an extremely low illuminance and the color information at an extremely high illuminance are reduced as described above, a problem may arise in that the generation of a monochrome pattern in the image may degrade image quality. In order to solve this problem, the noise remover 157, which is included in the image signal processor 153 of the present invention, sets a window of a predetermined size, with a center pixel as the reference, and the window includes multiple uniform blocks. Then, the noise remover 157 determines the magnitude of an edge component and an edge direction in the window, in consideration of a distribution of color signal values of pixels included in the window. Next, the noise remover 157 determines weights of the blocks in consideration of the magnitude of the edge component and the edge direction, and then performs a monochrome conversion (i.e. color desaturation) for converting the pixels in the YCbCr format to monochrome pixels. Then, the noise remover 157 determines a color signal value of the center pixel by reflecting the determined weights of the blocks in the monochrome-converted window.

Figure 4:
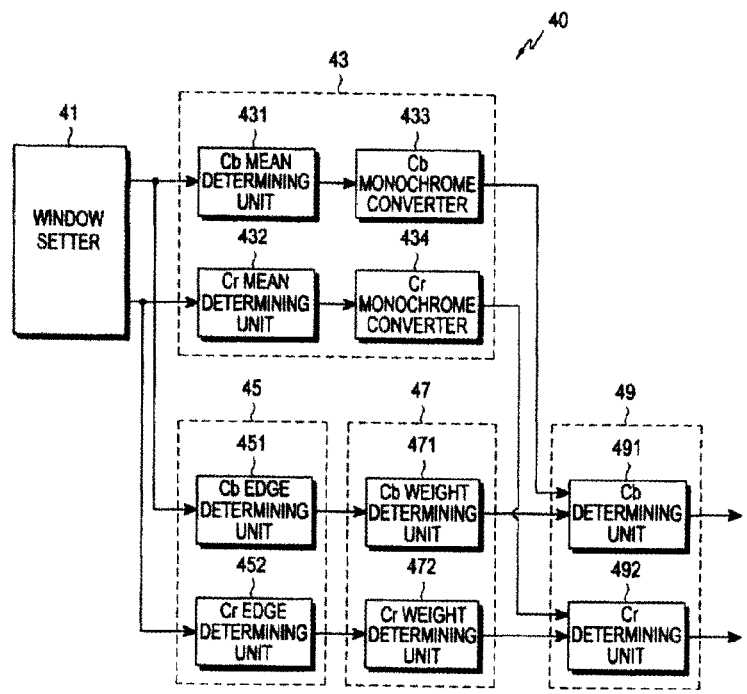
FIG. 4 is a block diagram illustrating a detailed configuration of a noise remover illustrated in FIG. 3.
Figure 5:
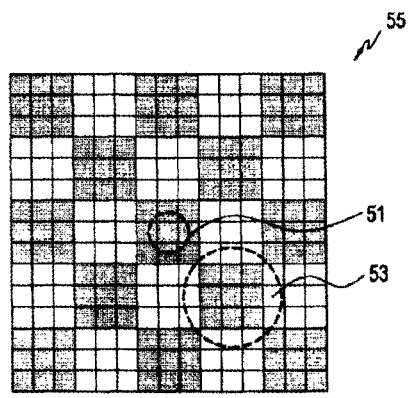
FIG. 5 is an illustrative view showing a window set by a window setter illustrated in FIG. 4.
Figure 6:
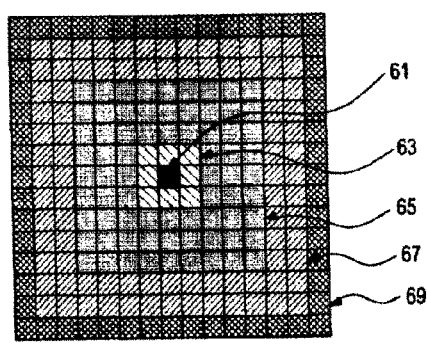
FIG. 6 is an illustrative view showing a weight set by a weight determining unit illustrated in FIG. 4.

FIG. 4 is a block diagram illustrating a detailed configuration of a noise remover illustrated in FIG. 3, FIG. 5 is an illustrative view showing a window set by a window setter illustrated in FIG. 4, and FIG. 6 is an illustrative view showing a weight set by a weight determining unit illustrated in FIG. 4.

Referring to FIG. 4, a noise remover 40 includes a window setter 41, a monochrome converter 43, an edge determining unit 45, a weight determining unit 47, and a color signal determining unit 49.

The window setter 41 sets both a block (see reference numeral 53 in FIG. 5) including at least one pixel and a window (see reference numeral 55 in FIG. 5) including the at least one block 53, with a center pixel (see reference numeral 51 in FIG. 5) as the reference. For example, the window setter 41 sets, with the center pixel 51 as the reference, the block 53 on a basis of 33 pixels and the window 55 on a basis of 55 blocks. Although an embodiment of the present invention illustrates the sizes and the shapes of a block and a window, the present invention is not limited to this configuration. Therefore, it should apparent that other configurations can be variously applied correspondingly to the sizes and the shapes of a block and a window by a person having ordinary knowledge in the technical field of the present invention.

Also, the window setter 41 sets a block and a window for each of Cb and Cr components of the image, and then outputs the set block and the set window.

The monochrome converter 43 performs a monochrome conversion on each of Cb and Cr components of the image by performing processing, such as chroma removal (i.e. chroma suppression), on each of Cb and Cr components of the image, which are provided by the window setter 41.

Further, the monochrome converter 43 may perform a monochrome conversion in each block included in the window. To this end, the monochrome converter 43 may include a Cb mean determining unit 431 and a Cr mean determining unit 432, which determine a mean of Cb components in each block and a mean of Cr components in each block, respectively. In order to determine a mean of Cb components in each block and a mean of Cr components in each block, the Cb mean determining unit 431 and the Cr mean determining unit 432 may calculate a mean of Cb components in each block and a mean of Cr components in each block by using equations (1) and (2) below, respectively.

$$Block_{Cb} = \sum_{i}^{N} \frac{Cb_i}{N} \quad (1)$$

$$Block_{Cr} = \sum_{i}^{N} \frac{Cr_i}{N} \quad (2)$$

In equations (1) and (2), Block Cb represents a mean of Cb components in each block, $Block_{Cr}$ represents a mean of Cr components in each block, $Cb_i$ represents a Cb value of the $i^{th}$ block, $Cr_i$ represents a Cr value of the block, and N represents the number of pixels included in a block.

The monochrome converter 43 further includes a Cb monochrome converter 433 and a Cr monochrome converter 434, which perform monochrome conversions on the mean of the Cb components in each block and the mean of the Cr components in each block, which are provided by the Cb mean determining unit 431 and the Cr mean determining unit 432, respectively.

The Cb monochrome converter 433 and the Cr monochrome converter 434 may perform monochrome processing on the mean of the Cb components in each block and the mean of the Cr components in each block by equations (3) and (4) below, respectively.

$$CS\_Block_{Cb} = Block_{Cb} \times Shrink_b \quad (3)$$

$$CS\_Block_{Cr} = Block_{Cr} \times Shrink_r \quad (4)$$

In equations (3) and (4), $CS\_Block_{Cb}$ and $CS\_Block_{Cr}$ represent values obtained by performing monochrome processing on the mean of the Cb components in each block and the mean of the Cr components in each block, respectively.

Also, in equations (3) and (4), $Shrink_b$ and $Shrink_r$ represent real numbers, which are equal to or greater than 0 and less than or equal to 1 may be calculated by using equation (5) below. Values which are predetermined depending on a luminance value and a chroma value, and may also be calculated by using equation (5) below.

$$Shrink = Chroma\_Shrink \times Luminance\_Shrink \quad (5)$$

The edge determining unit 45 determines the magnitude of an edge component and an edge direction in the window set by the window setter 41. Also, the edge determining unit 45 may include a Cb edge determining unit 451 for determining the magnitude of an edge component and an edge direction for a Cb component, and a Cr edge determining unit 452 for determining the magnitude of an edge component and an edge direction for a Cr component.

The Cb edge determining unit 451 determines the magnitude of the edge component and the edge direction for the Cb component included in the window by using equation (6) below. The Cr edge determining unit 452 determines the magnitude of the edge component and the edge direction for the Cr component included in the window by using equation (7) below.

$$EDGE_{Cb} = \sum_{i}^{N} Block_{Cb,i} \times w_i \quad (6)$$

$$EDGE_{Cr} = \sum_{i}^{N} Block_{Cr,i} \times w_i \quad (7)$$

In equations (6) and (7), $EDGE_{Cb}$ and $EDGE_{Cr}$ represent magnitudes of edge components for Cb and Cr components, respectively, and $w_i$ represents a filter coefficient.

For example, the Cb edge determining unit 451 and the Cr edge determining unit 452 may determine the magnitude of the edge component and the edge direction for the Cb component, and the magnitude of the edge component and the edge direction for the Cr component, which are included in the window, by using an edge filter such as a Sobel edge filter or a Canny edge filter.

Also, the Cb edge determining unit 451 and the Cr edge determining unit 452 may calculate directional projection values in eight directions by using equation (8) below. Then, they may determine the magnitude of the edge component and the edge direction for the Cb component, and the magnitude of the edge component and the edge direction for the Cr component by using the calculated directional projection values, respectively.

$$dir_{x,y,z} = \int_x \int_y \int_z g(x,y)\delta(\cos x + \sin y - z) \quad (8)$$

In equation (8), x and y represent pixel coordinate values in a window of the Cb or Cr component, and z represents a distance from a center point to the coordinates of each pixel in a window of the Cb or Cr component. For example, the directional projection values in each direction obtained by using equation (8) are as shown in the sets of equations (9(a)-9(h)) below.

dir[0][0]=(g[0][0]+g[0][1]+g[0][2]+g[0][3]+g[0][4])*12;

dir[0][1]=(g[1][0]+g[1][1]+g[1][2]+g[1][3]+g[1][4])*12;

dir[0][2]=(g[2][0]+g[2][1]+g[2][2]+g[2][3]+g[2][4])*12;

dir[0][3]=(g[3][0]+g[3][1]+g[3][2]+g[3][3]+g[3][4])*12;

dir[0][4]=(g[4][0]+g[4][1]+g[4][2]+g[4][3]+g[4][4])*12;            (9)(a)

dir[1][0]=(g[0][0]+g[1][2]+g[2][4])*20;

dir[1][1]=(g[1][1]+g[2][3])*30;

dir[1][2]=(g[1][0]+g[2][2]+g[3][4])*20;

dir[1][3]=(g[2][1]+g[3][3])*30;

dir[1][4]=(g[2][0]+g[3][2]+g[4][4])*20;                             (9)(b)

dir[2][0]=(g[0][2]+g[1][3]+g[2][4])*20;

dir[2][1]=(g[0][1]+g[1][2]+g[2][3]+g[3][4])*15;

dir[2][2]=(g[0][0]+g[1][1]+g[2][2]+g[3][3]+g[4][4])*12;

dir[2][3]=(g[1][0]+g[2][1]+g[3][2]+g[4][3])*15;

dir[2][4]=(g[2][0]+g[3][1]+g[4][2])*20;                             (9)(c)

dir[3][0]=(g[0][2]+g[2][3]+g[4][4])*20;

dir[3][1]=(g[1][2]+g[3][3])*30;

dir[3][2]=(g[0][1]+g[2][2]+g[4][3])*20;

dir[3][3]=(g[1][1]+g[3][2])*30;

dir[3][4]=(g[0][0]+g[2][1]+g[4][2])*20;                             (9)(d)

dir[4][0]=(g[0][0]+g[1][0]+g[2][0]+g[3][0]+g[4][0])*12;

dir[4][1]=(g[0][1]+g[1][1]+g[2][1]+g[3][1]+g[4][1])*12;

dir[4][2]=(g[0][2]+g[1][2]+g[2][2]+g[3][2]+g[4][2])*12;

dir[4][3]=(g[0][3]+g[1][3]+g[2][3]+g[3][3]+g[4][3])*12;

dir[4][4]=(g[0][4]+g[1][4]+g[2][4]+g[3][4]+g[4][4])*12;             (9)(e)

dir[5][0]=(g[0][4]+g[2][3]+g[4][2])*20;

dir[5][1]=(g[1][3]+g[3][2])*30;

dir[5][2]=(g[0][3]+g[2][2]+g[4][1])*20;

dir[5][3]=(g[1][2]+g[3][1])*30;

dir[5][4]=(g[0][2]+g[2][1]+g[4][0])*20;                             (9)(f)

dir[6][0]=(g[2][4]+g[3][3]+g[4][2])*20;

dir[6][1]=(g[1][4]+g[2][3]+g[3][2]+g[4][1])*15 dir[6][2]=(g[0][4]+g[1][3]+g[2][2]+g[3][1]+g[4][0])*12;

dir[6][3]=(g[0][3]+g[1][2]+g[2][1]+g[3][0])*15;

dir[6][4]=(g[0][2]+g[1][1]+g[2][0])*20;                             (9)(g)

dir[7][0]=(g[2][4]+g[3][2]+g[4][0])*20;

dir[7][1]=(g[2][3]+g[3][1])*30;

dir[7][2]=(g[1][4]+g[2][2]+g[3][0])*20;

dir[7][3]=(g[1][3]+g[2][1])*30; and dir[7][4]=(g[0][4]+g[1][2]+g[2][0])*20.                             (9)(h)

In the sets of equations (9)(a)-(9)(h), constants including 12, 15, 20 and 30, which are written at the end of each line, are values used as multipliers to calculate common multiples necessary in the process of obtaining directional projection values in the eight directions.

Also, the Cb edge determining unit 451 and the Cr edge determining unit 452 calculate the maximum difference (i.e. the largest contrast difference) among differences between the directional projection values obtained in each direction. For example, the Cb edge determining unit 451 and the Cr edge determining unit 452 may calculate the maximum projection value difference (i.e. the largest contrast difference) among the differences between the directional projection values obtained in each direction, by using equation (10) below.

Then, the Cb edge determining unit 451 and the Cr edge determining unit 452 may detect an edge direction by using equation (11) below.

$$\text{diff}_p = \max(\text{dir}_{i,j,k} - \text{dir}_{i,j,l}) \quad (10)$$

In equation (10), $\text{diff}_p$ represents the magnitude of an edge component in each direction, i and j represent pixel coordinate values, and k and l represent a distance from a center point to the coordinates of each pixel in a window of a Cb or Cr component.

$$\text{dir} = \text{argmax}_p(|(\text{diff}_{p-1}/2 + \text{diff}_p + \text{diff}_{p+1}/2) - (\text{diff}_{p+3}/2 + \text{diff}_{p+4} + \text{diff}_{p+5}/2)|) \quad (11)$$

In equation (11), dir represents an edge direction (i.e. the direction of an edge), and $\text{diff}_{P-1}$, $\text{diff}_P$, $\text{diff}_{P+1}$, $\text{diff}_{P+2}$, $\text{diff}_{P+3}$, $\text{diff}_{P+4}$ and $\text{diff}_{P+5}$ represent magnitudes of edge components according to the eight directions, respectively.

As described above, the Cb edge determining unit 451 and the Cr edge determining unit 452 may determine the magnitude of the edge component and the edge direction for the Cb component, and the magnitude of the edge component and the edge direction for the Cr component, by using equations (8) to (11), respectively. Then, the Cb edge determining unit 451 and the Cr edge determining unit 452 output the magnitude of the edge component and the edge direction for the Cb component, and the magnitude of the edge component and the edge direction for the Cr component, respectively.

Although the edge determining unit 45 illustrates that an edge direction is any one direction selected among the above eight directions, the present invention is not limited to this configuration. Thus, the edge direction may be a direction obtained by combining at least two directions among the above eight directions.

Meanwhile, the weight determining unit 47 determines a weight to be set in each block of the window, in consideration of the magnitude of the edge component and the edge direction, which are provided by the edge determining unit 45. Specifically, since the edge determining unit 45 provides the weight determining unit 47 (47?) with the magnitude of the edge component and the edge direction for each of the Cb and Cr components, the weight determining unit 47 includes a Cb weight determining unit 471 for determining a weight for the Cb component, and a Cr weight determining unit 472 for determining a weight for the Cr component.

For example, each of the Cb weight determining unit 471 and the Cr weight determining unit 472 may include a filter predetermined depending on the magnitude of an edge component and an edge direction. A coefficient of the predetermined filter may be set through the following algorithm. First, a 2-dimensional (2D) Gaussian smoothing filter is defined and then a direction and a form of a covariance matrix of the 2D Gaussian smoothing filter are determined, by equation (12) below. Then, an eigenvector of the covariance matrix is determined and principal components of the covariance matrix of the 2D Gaussian smoothing filter are equally defined to predefined projection direction p, by using equation (13) below. Next, eigenvalues of a direction and eigenvalues of a direction (principal components) perpendicular to the direction are determined; that is, they are calculated as the deviation of projection frequency cosine coefficient by using equation (14) below. A normal distribution is calculated by converting a $\delta_{freq}$ value in the frequency domain to a $\delta_{spatial}$ value in the space domain by using equation (15) below.

$$G(x) = \frac{1}{2\pi\sqrt{|\Sigma|}} e^{-\frac{1}{2}(x\Sigma^{-1}x^T)} \quad (12)$$

In equation (12) directly above, G(x) represents a 2D Gaussian smoothing filter, and $\Sigma$ represents a covariance matrix.

$$x \cdot \cos(\theta) + y \cdot \sin(\theta) = 0 \quad (13)$$

$$\sigma_{freq} = \sqrt{\frac{\sum_i (i * freq(i))^2}{\sum_i freq(i)}} \quad (14)$$

In equation (14) directly above, $\sigma_{freq}$ represents the deviation of a projection frequency cosine coefficient, and i represents a frequency index ($-4 \le i \le 4$ and $i \ne 0$).

$$\sigma_{spatial} = \frac{\sqrt{4\ln 2}}{2\ln 2} \sigma_{freq} \quad (15)$$

In this case, if an area changes depending on the directions of two principal vectors, a Gaussian distribution may become circular or oval in shape.

Further, although an embodiment of the present invention has illustrated that the weight determining unit 47 determines a weight as described above, the present invention is not limited to this configuration. Therefore, for the present invention, it is sufficient if the weight determining unit 47 may set different weights for at least two blocks included in the window.

Also, the weight determining unit 47 compares the magnitude of the edge component, which is provided by the edge determining unit 45, with a predetermined value. When the magnitude of the edge component is smaller than the predetermined value, a result of the comparison may be applied to a predetermined pattern. For example, the predetermined pattern makes it possible to determine the magnitude of a weight, with a distance from a center pixel 61 as the reference, as illustrated in FIG. 6. Namely, the predetermined pattern makes it possible to differently set magnitudes of weights in the following order: the center pixel 61, a first area 63, a second area 65, a third area 67, and a fourth area 69.

The color signal determining unit 49 determines a color signal value, by applying a weight of each block—which has been determined by the weight determining unit 47—to the window, which has been converted to a monochrome window by the monochrome converter 43. The color signal determining unit 49 may determine a color signal in a window of each of Cb and Cr components, and to this end, may include a Cb determining unit 491 and a Cr determining unit 492.

For example, the Cb determining unit 491 and a Cr determining unit 492 may determine a color signal in the window of the Cb component and a color signal in the window of the Cr component by using equations (16) and (17) below, respectively.

$$MEAN_{Cb} = \sum_i^N Block_{Cb,i} \times w_i \quad (16)$$

$$MEAN_{Cr} = \sum_{i}^{N} Block_{Cr,i} \times w_i \tag{17}$$

In equations (16) and (17), $w_i$ represents a weight coefficient provided by the weight determining unit 47.

Figure 7:
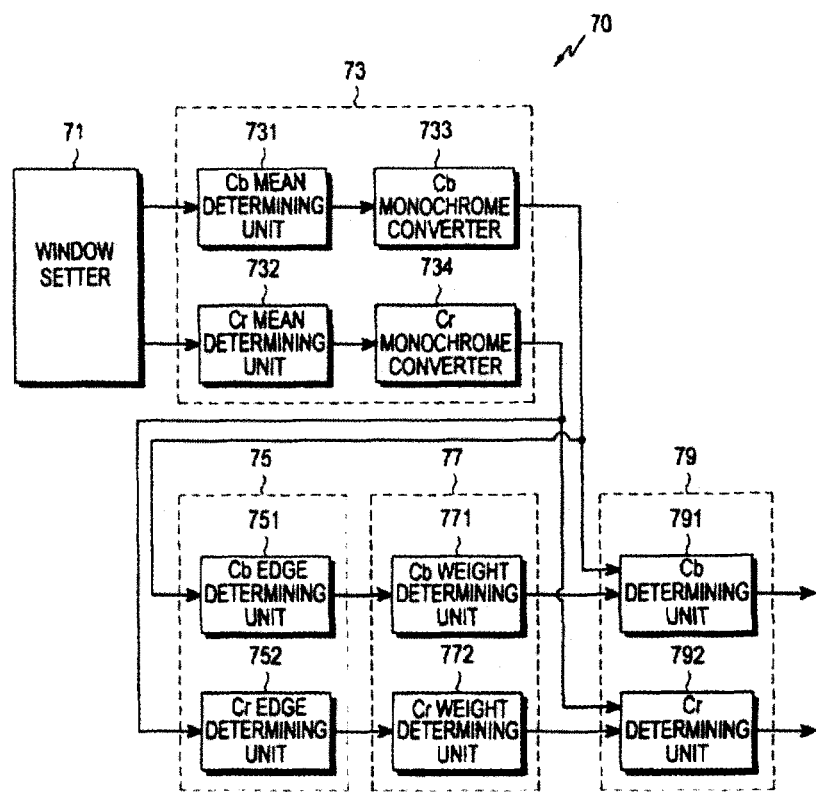
FIG. 7 is a block diagram illustrating a detailed configuration of a noise remover included in a portable terminal according to another embodiment of the present invention.

As described above, it has been illustrated that the noise remover (see reference numeral 40 in FIG. 4) included in the portable terminal according to an embodiment of the present invention determines the edge in the window of the Cb component and the edge in the window of the Cr component, which are provided by the window setter 41. On the other hand, a noise remover (see reference numeral 70 in FIG. 7) included in a portable terminal according to another embodiment of the present invention determines an edge in a window of a Cb component and an edge in a window of a Cr component, which are provided by a monochrome converter 73.

The noise remover (see reference numeral 70 in FIG. 7) included in the portable terminal according to a second embodiment of the present invention is different from the noise remover (see reference numeral 40 in FIG. 4) included in the portable terminal according to a first embodiment of the present invention, only in that an edge determining unit 75 determines an edge in a window of a Cb component and an edge in a window of a Cr component, which are provided by the monochrome converter 73. However, the noise remover included in the portable terminal according to the second embodiment of the present invention similarly performs setting of a window, processing of a mean of Cb components in each block and a mean of Cr components in each block, processing of a monochrome conversion, processing of edge determination, processing of weight determination, processing of color signal determination, etc., to those performed by the noise remover included in the portable terminal according to the first embodiment of the present invention. Therefore, reference will be made to the above configuration and operation of the noise remover included in the portable terminal according to the first embodiment of the present invention, for detailed configurations and detailed operations of a window setter 71, as follows: a monochrome converter 73, a Cb mean determining unit 731, a Cr mean determining unit 732, a Cb monochrome converter 733, a Cr monochrome converter 734, an edge determining unit 75, a Cb edge determining unit 751, a Cr edge determining unit 752, a weight determining unit 77, a Cb weight determining unit 771, a Cr weight determining unit 772, a color signal determining unit 79, a Cb determining unit 791, and a Cr determining unit 792; this specific configuration performs setting of a window, processing of a mean of Cb components in each block and a mean of Cr components in each block, processing of a monochrome conversion, processing of edge determination, processing of weight determination, and processing of color signal determination.

Figure 8:
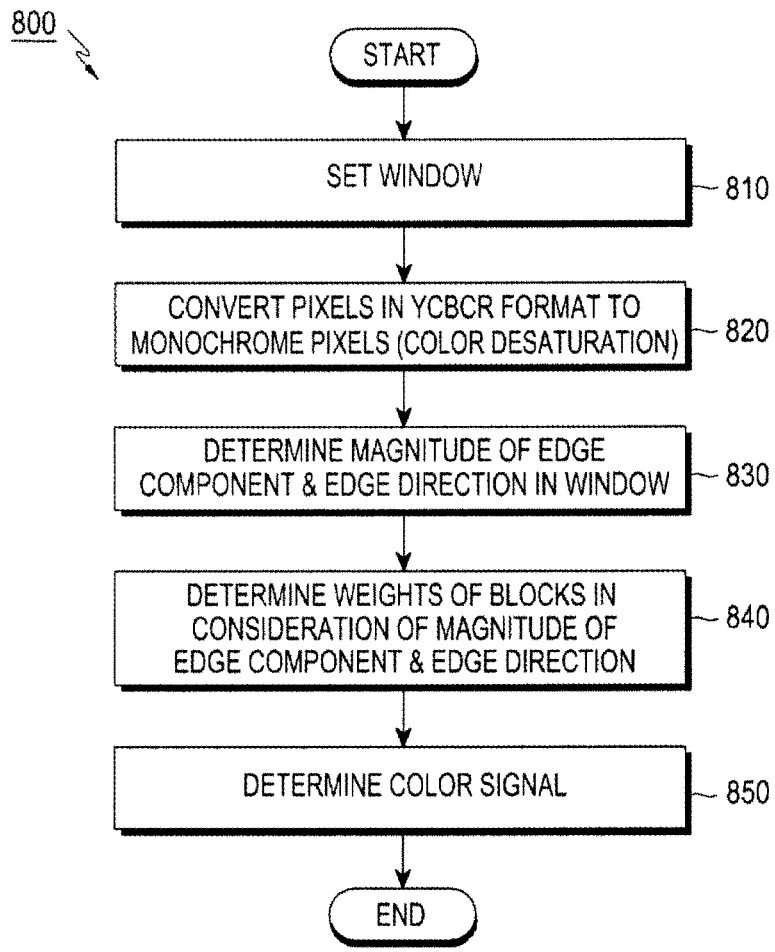
FIG. 8 is a flowchart showing a method for image processing according to an embodiment of the present invention.

FIG. 8 is flowchart 800 showing a method for image processing according to an embodiment of the present invention. Referring to FIG. 8, according to a method for image processing in accordance with an embodiment of the present invention, a window is first set for an input image. Namely, in step 810, an image in the YCbCr format is received as input, and then both a block (see reference numeral 53 in FIG. 5) including at least one pixel and a window (see reference numeral 55 in FIG. 5) including the at least one block 53 are set with a center pixel (see reference numeral 51 in FIG. 5) of the image in the YCbCr format as the reference. For example, with the center pixel 51 as the reference, the block 53 on a basis of 3×3 pixels is set and then the window 55 on a basis of 5×5 blocks is set. Also, the window 55 for each of Cb and Cr components is set and then outputted.

Although an embodiment of the present invention illustrates particular sizes and shapes of a block and a window, the present invention is not limited to this configuration. Therefore, one having ordinary knowledge in the technical field to which the present invention belongs can use different configurations, and thus use different sizes and the shapes of a block and a window respectively.

In step 820, a monochrome conversion is performed on each of Cb and Cr components by performing processing, such as chroma removal (i.e. chroma suppression), on each of the Cb and Cr components. Specifically, a monochrome conversion may be performed in each of the blocks included in the window. To this end, a mean of Cb components in each block and a mean of Cr components in each block are determined, and are then processed by a monochrome conversion. For example, a mean of Cb components in each block and a mean of Cr components in each block may be determined by using equations (1) and (2), and monochrome conversions on the mean of the Cb components in each block and the mean of the Cr components in each block may be performed by using equations (3) and (4), respectively.

In step 830, the magnitudes of an edge component and an edge direction are determined. Specifically, the magnitude of an edge component and an edge direction for a Cb component included in the window are determined by using equation (6), and the magnitude of an edge component and an edge direction for a Cr component included in the window are determined by equation (7).

For example, the magnitude of an edge component and an edge direction for a Cb component and the magnitude of an edge component and an edge direction for a Cr component, which are included in the window, may be determined by using an edge filter such as a Sobel edge filter or a Canny edge filter.

The magnitude of an edge component and an edge direction for a Cb component and the magnitude of an edge component and an edge direction for a Cr component, which are included in the window, may be determined by using directional projection values in eight directions obtained by equation (8), a specific example of which is shown in equations (9)(a)-(9)(h). Then, by calculating the maximum difference (i.e. the largest contrast difference) among differences between the directional projection values obtained in each direction, the maximum projection value difference (i.e. the largest contrast difference) among the differences between the directional projection values obtained in each direction may be obtained. Then, the magnitude of an edge component in each direction may be calculated by using equation (10), and an edge direction may be detected by using equation (11).

Although it is illustrated that an edge direction is set to any one direction selected among the above eight directions in the method according to an embodiment of the present invention, the present invention is not limited to this configuration, and thus, for example, the edge direction may be set to a direction obtained by combining at least two directions among the above eight directions.

Further, although it has been illustrated that the magnitude of an edge component and an edge direction in a window of a Cb or Cr component included in the original image are determined in step 830, the magnitude of an edge component and an edge direction in a window of a Cb or Cr component, on which a monochrome conversion is performed, may also be determined.

Then, in step 840, a weight to be set in each block of the window is determined in consideration of the magnitude of the edge component and the edge direction, which have been determined in step 830. Specifically, weights for the Cb and Cr components are determined by using the magnitudes of the edge components and the edge directions, which have been determined for the Cb and Cr components, respectively.

Also, a weight may be determined by using a filter predetermined depending on the magnitude of an edge component and an edge direction, and a coefficient of the predetermined filter may be set through the following algorithm. First, a 2-dimensional (2D) Gaussian smoothing filter is defined and then a direction and a form of a covariance matrix of the 2D Gaussian smoothing filter are determined, by equation (12). Then, an eigenvector of the covariance matrix is determined and then principal components of the covariance matrix of the 2D Gaussian smoothing filter are equally defined to predefined projection direction p, by using equation (13). Next, eigenvalues of a direction and eigenvalues of a direction perpendicular (principal components) to the direction are determined (i.e. calculated as the deviation of projection frequency cosine coefficient) by using equation (14). Then, a normal distribution is calculated by converting a $\sigma_{freq}$ value in the frequency domain to a $\sigma_{spatial}$ value in the space domain by using equation (15). By using equations (12) to (15), a coefficient of the predetermined filter is set, and then the magnitude of the edge component and the edge direction determined in step 830 are applied to the set filter; by doing this, a weight is determined for each of the blocks included in the window.

Although an embodiment of the present invention has illustrated that a weight is determined as described above, the present invention is not limited to this configuration. Therefore, it is enough if different weights may be set for at least two blocks included in the window.

Then, step 840 may further include a process, in which the magnitude of the edge component determined in step 830 is compared with a predetermined value and then a result of the comparison is applied to a predetermined pattern when the magnitude of the edge component is smaller than the predetermined value. For example, the predetermined pattern makes it possible to determine the magnitude of a weight, with a distance from a center pixel 61 as the reference, as illustrated in FIG. 6. Namely, the predetermined pattern makes it possible to set magnitudes of weights in the order of the center pixel 61, a first area 63, a second area 65, a third area 67, and a fourth area 69.

In step 850, a color signal is determined by applying weights of the blocks for each of the Cb and Cr components determined in step 840 to the window which has been converted to a monochrome window in step 820. For example, a color signal in a window of the Cb component and a color signal in a window of the Cr component may be determined by using equations (16) and (17).

It is apparent that the method for image processing of the present invention may be implemented by either hardware, software (i.e. a program) or a combination thereof. This program may be stored in volatile or nonvolatile recording media readable by an apparatus such as a computer. The recording media may include a storage element such as a ROM (Read Only Memory), memories such as a RAM (Random Access Memory), a memory chip, an integrated circuit, optical or magnetic recording media such as a CD (Compact Disc), a DVD (Digital Versatile Disc), a magnetic disc and a magnetic tape. The method for edge-adaptive interpolation and noise filtering according to the present invention may be implemented by a program including a code for implementing the method. Further, this program may be electrically transmitted by an optional medium in such a manner that a communication signal is transmitted wirelessly or through a wire, and thus the present invention may include the equivalents of these configurations.

Using the method and apparatus for image processing of the present invention, an image can be processed without generating a gray spot while removing noise included in the image.

Also, the method for image processing of the present invention allows that by first performing a process (i.e. color desaturation) for reducing color information of the image, it is possible to prevent the generation of gray spots when noise in the image is removed.

While the invention has been shown and described with reference to certain exemplary embodiments thereof, it will be understood by those skilled in the art that various changes in form and details may be made therein without departing from the spirit and scope of the invention. Therefore, the spirit and scope of the present invention are defined not by the described embodiments herein, but by the appended claims and their equivalents.

What is claimed is:

1. A method of image processing, the method comprising:
   setting a window of an image signal in a certain format, the window comprising at least one block having a center pixel as a reference;
   converting the window of the image signal to a window of a monochrome image signal;
   determining a magnitude of an edge component and a direction of the edge component in a selected window;
   determining a weight of the at least one block of the selected window based on the magnitude of the edge component and the direction of the edge; and
   determining a color signal value of the center pixel of the monochrome window based at least on the determined weight.

2. The method of claim 1, wherein the certain format of the image signal is an RGB format and the step of converting the window of the image signal to a window of a monochrome image signal comprises converting the image signal in an RGB format to a signal in a YCbCr format prior to converting the window the window of the image signal to a window of a monochrome signal.

3. The method of claim 1, wherein the certain format of the image signal is an YCbCr format.

4. The method of claim 1, wherein the selected window is the window of the image signal.

5. The method of claim 4, wherein the step of determining a magnitude of an edge component and a direction of the edge component comprises:
   calculating directional projection values for a predetermined number of directions;
   calculating differences among the calculated directional projection values; and
   selecting a largest difference among the calculated differences; and
   determining the magnitude of the edge component and the direction of the edge based on (i) the calculated directional projection values, (ii) the calculated differences among the calculated directional projection values and (iii) the largest difference among the calculated differences.

6. The method of claim 4, wherein the step of determining a weight comprises:
   providing a filter based on the magnitude of the edge component and the direction of the edge component;
   setting a coefficient of the filter through an algorithm based on defined filter characteristics; and applying the magnitude of the edge component and the direction of the edge component to the set filter to determine the weight of the at least one block.

7. The method of claim 4, wherein the step of determining a weight comprises:
comparing the magnitude of the edge component with a predetermined value; and
applying the result of the comparison to a predetermined pattern when the magnitude of the edge component is smaller than the predetermined value.

8. The method of claim 1, wherein the selected window is the window of the monochrome image signal.

9. The method of claim 8, wherein the step of determining a magnitude of an edge component and a direction of the edge component comprises:
calculating directional projection values for a predetermined number of directions;
calculating differences among the calculated directional projection values; and
selecting a largest difference among the calculated differences; and
determining the magnitude of the edge component and the direction of the edge based on (i) the calculated directional projection values, (ii) the calculated differences among the calculated directional projection values and (iii) the largest difference among the calculated differences.

10. The method of claim 8, wherein the step of determining a weight comprises:
providing a filter based on the magnitude of the edge component and the direction of the edge component;
setting a coefficient of the filter through an algorithm based on defined filter characteristics; and
applying the magnitude of the edge component and the direction of the edge component to the set filter to determine the weight of the at least one block.

11. The method of claim 8, wherein the step of determining a weight comprises:
comparing the magnitude of the edge component with a predetermined value; and
applying the result of the comparison to a predetermined pattern when the magnitude of the edge component is smaller than the predetermined value.

12. An apparatus for image processing, the apparatus comprising:
an image format converter having an output and said image format converter converts an image signal in an RGB format to an image signal in a YCbCr format; and
a noise remover coupled to the output of the image format converter where said noise remover sets a window of the image signal in a YCbCr format having Cb and Cr components, said image signal window comprising at least one block having a center pixel as a reference and where the noise remover converts the window to a monochrome window and determines a magnitude of an edge component and a direction of the edge component of the window, and determines a weight of the at least one block based on the magnitude of the edge and the direction of the edge and further determines a color signal value of the center reference center pixel of the monochrome window based on the determined weight.

13. The apparatus of claim 12, wherein the noise remover comprises:
a window setter having an output, an input to which the image signal can be applied and where the window setter sets the window of the image signal;
a monochrome converter having an output, and an input coupled to the output of the window setter where said monochrome converter comprises a Cb monochrome converter unit with an output and a Cr monochrome converter unit with an output;
an edge determining unit having an output and an input coupled to the output of the window setter;
a weight determining unit having an output and an input coupled to the output of the edge determining unit where said weight determining unit comprises a Cb weight determining unit having an output and a Cr weight determining unit having an output;
a color signal determining unit having an output, and an input coupled to the output of the weight determining unit and to the output of the monochrome converter.

14. The apparatus of claim 13, wherein the monochrome converter comprises a Cb mean determining unit coupled to a Cb monochrome converter unit and a Cr mean determining unit coupled to a Cr monochrome converter unit where the Cb and Cr mean determining units determine a mean for the Cb component and a mean for the Cr component respectively of the at least one block of the image signal and where the Cb and Cr monochrome units perform monochrome conversions on the Cb mean and the Cr mean respectively.

15. The apparatus of claim 13, wherein the edge determining unit is coupled to the weight determining unit, said edge determining unit comprising a Cb edge determining unit and a Cr edge determining unit coupled to a Cb weight determining unit and a Cr weight determining unit respectively of the weight determining unit.

16. The apparatus of claim 13, wherein the color signal determining unit comprises a Cb determining unit and a Cr determining unit coupled to the output of the Cb weight determining unit and the output of the Cr weight determining unit respectively of the weight determining unit and the output of the monochrome converter is also coupled to the color signal determining unit wherein the output of the Cb weight determining unit and the output of the Cr weight determining unit are coupled to the Cb determining unit and the Cr determining unit respectively.

17. The apparatus of claim 12, wherein the noise remover comprises:
a window setter having an output, an input to which the image signal can be applied and where the window setter sets the window of the image signal;
a monochrome converter having an output, and an input coupled to the output of the window setter where said monochrome converter comprises a Cb monochrome converter unit with an output and a Cr monochrome converter unit with an output;
an edge determining unit having an output, and an input coupled to the output of the monochrome converter;
a weight determining unit having an output, and an input coupled to the output of the edge determining unit where said weight determining unit comprises a Cb weight determining unit having an output and a Cr weight determining unit having an output; and
a color signal determining unit having an output, and an input coupled to the output of the weight determining unit and to the output of the monochrome converter.

18. The apparatus of claim 17, wherein the monochrome converter comprises a Cb mean determining unit coupled to a Cb monochrome converter unit and a Cr mean determining unit coupled to a Cr monochrome converter unit where the Cb and Cr mean determining units determine a mean for the Cb component and a mean for the Cr component respectively of the at least one block of the image signal and where the Cb and Cr monochrome units perform monochrome conversions on the Cb mean and the Cr mean respectively.

19. The apparatus of claim 17, wherein the edge determining unit is coupled to the weight determining unit, said edge determining unit comprising a Cb edge determining unit and a Cr edge determining unit coupled to a Cb weight determining unit and a Cr weight determining unit respectively of the weight determining unit where said Cb weight determining unit has an output and said Cr weight determining unit has an output.

20. The apparatus of claim 17, wherein the color signal determining unit comprises a Cb determining unit and a Cr determining unit coupled to the output of the Cb weight determining unit and the output of the Cr weight determining unit respectively of the weight determining unit and the output of the monochrome converter is also coupled to the color signal determining unit wherein the output of the Cb weight determining unit and the output of the Cr weight determining unit are coupled to the Cb determining unit and the Cr determining unit respectively.

* * * * *

UNITED STATES PATENT AND TRADEMARK OFFICE
CERTIFICATE OF CORRECTION

| | | |
|---|---|---|
| PATENT NO. | : 8,736,721 B2 | Page 1 of 1 |
| APPLICATION NO. | : 13/652036 | |
| DATED | : May 27, 2014 | |
| INVENTOR(S) | : Hee-Chan Park et al. | |

It is certified that error appears in the above-identified patent and that said Letters Patent is hereby corrected as shown below:

In the Claims:

Column 14, Lines 40-41 should read as follows:
--…converting the window of…--

Signed and Sealed this
Fifth Day of August, 2014

Michelle K. Lee
*Deputy Director of the United States Patent and Trademark Office*